United States Patent [19]

Dewey

[11] Patent Number: 4,932,490
[45] Date of Patent: Jun. 12, 1990

[54] ENGINE AIR INDUCTION SYSTEM WITH AIR CLEANER IN HOOD

[75] Inventor: Dallas D. Dewey, Hicksville, Ohio

[73] Assignee: Navistar International Transportation Corp., Chicago, Ill.

[21] Appl. No.: 414,887

[22] Filed: Sep. 29, 1989

[51] Int. Cl.⁵ ............................................. B60K 13/02
[52] U.S. Cl. .................................. 180/68.3; 55/385.3; 55/DIG. 28; 180/69.21
[58] Field of Search ................. 180/68.3, 69.21, 89.14; 55/385.3, DIG. 28; 181/229

[56] References Cited

U.S. PATENT DOCUMENTS

| | | | |
|---|---|---|---|
| 2,133,316 | 10/1938 | Altgelt | 180/68.3 |
| 2,701,024 | 2/1955 | Thomas | 180/69.21 |
| 2,952,327 | 9/1960 | Farr | 180/68.3 |
| 3,232,368 | 2/1966 | Sullivan | 180/68.3 |
| 3,641,744 | 2/1922 | Culbert | 180/68.3 |
| 3,641,746 | 2/1972 | Smith et al. | 55/385 |

FOREIGN PATENT DOCUMENTS 0178553  5/1954  Austria ............................. 180/68.3

*Primary Examiner*—David M. Mitchell
*Attorney, Agent, or Firm*—F. David AuBuchon; Dennis K. Sullivan

[57] ABSTRACT

A vehicle having an engine compartment and a hood enclosing the engine compartment and opening forwardly of the vehicle about a horizontal pivot axis located forward of the engine is provided with an air cleaner removably mounted within an enclosed compartment on the under side of the hood and a clean air passage disposed within said hood extends from a first end open to the clean side of said air cleaner to an outlet in said hood adjacent the horizontal pivot axis. A flexible hose connects the clean air passage outlet to the engine air intake to permit opening and closing the hood without breaking the clean air connection. The intake air to the air cleaner is preferably drawn through an air passage in the hood extending from an inlet adjacent the grille to the dirty air side of the air cleaner.

4 Claims, 1 Drawing Sheet

ENGINE AIR INDUCTION SYSTEM WITH AIR CLEANER IN HOOD

CROSS-REFERENCE TO RELATED APPLICATION

This application is related to copending application Ser. No. 374,496, filed June 30, 1989 and assigned to the assignee hereof.

BACKGROUND OF THE INVENTION

This invention relates to vehicle hoods, particularly for trucks, of the type which encloses the engine compartment and tilts forwardly away from the truck chassis to expose the engine for service and, more particularly, to an engine air induction system having an air cleaner incorporated in the hood.

THE PRIOR ART

It is previously known to provide ducts within a truck hood to deliver air from the vehicle exterior to the engine. U.S. Pat. No. 3,232,368 to Sullivan teaches a molded fiberglass hood having a rear reinforcement beam bonded to the skin which defines a duct opening through the skin at the rear portion of the hood sides. Within the engine compartment, the duct interfaces with the engine air cleaner mounted within the engine compartment to draw induction air into the engine. Another example of this type of system is disclosed in the above-mentioned copending application.

It is further known to mount an air cleaner in the hood of an automobile, as shown in U.S. Pat. No. 2,952,327. Although the design shown in this patent has the advantages of isolating the air cleaner from engine vibrations and of moving the air cleaner out of the way when the hood is opened to service the engine, it also has the disadvantage of breaking the connection of the filtered air passage when the hood is opened, thereby enabling potentially harmful dirt to enter the engine without passing through the air cleaner. U.S. Pat. No. 2,133,316 discloses an air cleaner mounted in the hood of a farm tractor. However, it appears that the hood is not movable.

SUMMARY OF THE INVENTION

Accordingly, it is the primary object of the invention described and claimed herein to provide for an air cleaner mounted in the vehicle hood wherein the induction air connection between the air cleaner and the engine air inlet is not broken when the hood is opened to service the engine.

This object is specifically met in a vehicle having an engine compartment and a hood enclosing the engine compartment and opening forwardly of the vehicle about a horizontal pivot axis located forward of the engine wherein an air cleaner is removably mounted within an enclosed compartment on the under side of the hood and a clean air passage disposed within said hood extends from a first end open to the clean side of said air cleaner to an outlet in said hood adjacent the horizontal pivot axis. A flexible hose connects the clean air passage outlet to the engine air intake. The intake air to the air cleaner is preferably drawn through a dirty air passage in the hood extending from an inlet adjacent the grille to the dirty air side of the air cleaner.

The air induction system of the invention thus provides both the advantages of isolation the air cleaner from engine vibration and removing the air cleaner from the engine compartment while the engine is being serviced, yet provides the further advantage of maintaining the clean air connection at all times other than when the air cleaner is removed.

DESCRIPTION OF THE DRAWINGS

Other objects and advantages of the invention will become more apparent upon perusal of the detailed description thereof and upon inspection of the drawings in which.

DESCRIPTION OF THE PREFERRED EMBODIMENT

Figure 1:
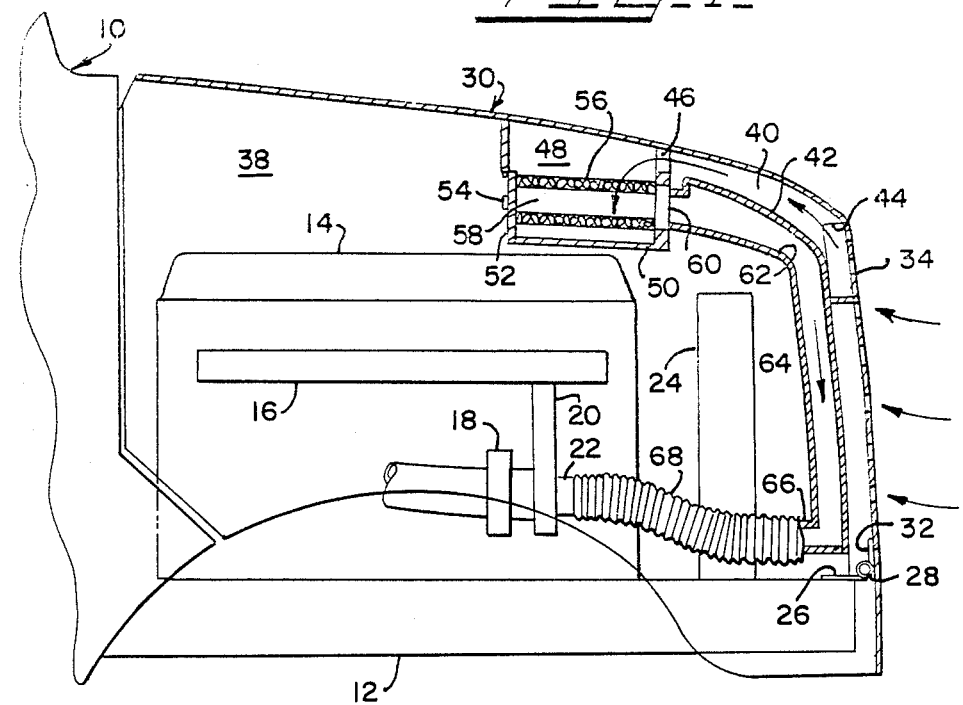
FIG. 1 is a right side view, partially in section, of the froward portion of the body of a highway truck incorporating a hood constructed in accordance with the invention with the truck engine illustrated diagrammatrically.
Figure 2:
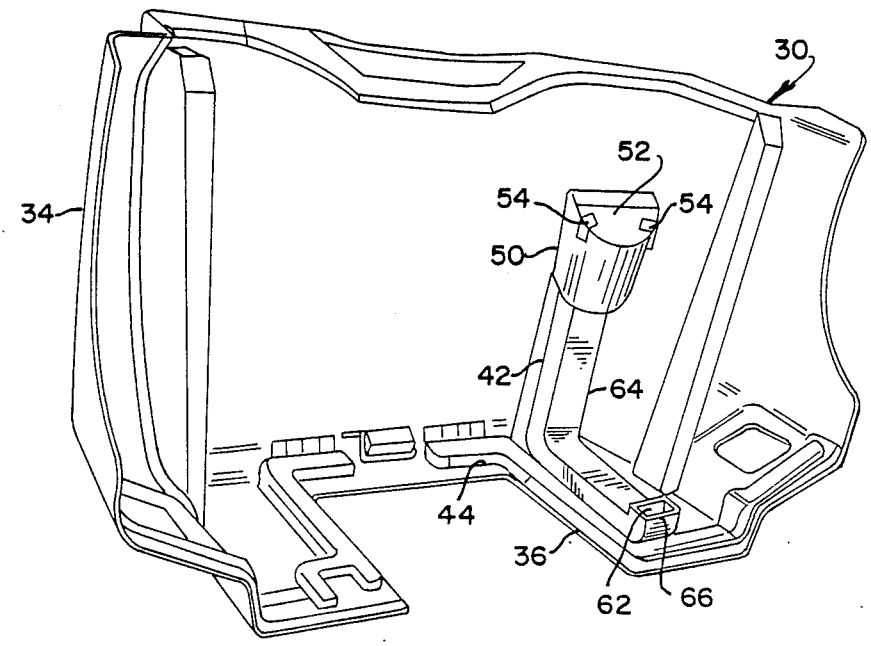
FIG. 2 is a perspective view of the underside of the hood of the truck of FIG. 1.

Referring now to the drawings, there is shown in FIG. 1 the forward body portion 10 of a highway truck supported on longitudinally extending parallel frame rails, one being shown at 12. An internal combustion engine 14 is mounted to frame rails 12, the engine 14 including an intake manifold 16, a conventional turbocharger 18 having a compressor outlet 20 connected to the intake manifold and an induction air intake 22. Forward of the engine, a radiator 24 is mounted to the frame rails 12.

A pivot support bracket 26 is attached to the front end of the frame rails 12 and extends forwardly thereof to a horizontal transverse pivot pin 28 defining a pivot axis for hood 30 pivotally mounted to pivot pin by bracket 32 attached to the hood so that the hood 30 may pivot about pin 28 between the closed position illustrated and an open position with the hood forward of the pivot axis for servicing the engine 14. The hood 30 includes an exterior skin 34 substantially enclosing the top and sides of the engine to form an engine compartment 38 and having a cutout portion 36 in its forward wall for receiving a grille (not shown) for admitting ambient air to the engine compartment 38 and the radiator 24 and engine 14 for cooling purposes. It will be appreciated that the foregoing description is simply that of a conventional highway truck.

In accordance with the invention, an interior intake or dirty air passage 40 is formed within the skin 34 of hood 30 by wall 42, the intake passage 40 extending from an ambient air intake 44 opening transversely into the grille area 36 of hood 40 to an outlet 46 into the dirty air side 48 of a filter compartment 50 bonded to the inner side of skin 34 of hood 30. The compartment 50 is provided with a hinged door 52, retained by latches 54, through which an air filter cartridge 56 may be inserted. The clean air side 58 of the cartridge 56 abuts against and encloses opening 60 into clean air passage 62 formed between wall 42 and inner wall 64 bonded or molded to the skin 34 and extending along the inner periphery thereof to an outlet 66 disposed adjacent the pivot pin 28. A flexible hose 68 extending between outlet 66 and intake 32 fluidly interconnects the clean air passage 62 with the turbocharger compressor air intake. The hose 68 may be longitudinally extendable, as by having a corrugated flexible wall or may simply be of sufficient length to move with the outlet 66 when the hood is opened without breaking its connection to the engine air intake 22.

When the engine 14 is operated, the engine and turbocharger 18 will generate a vacuum at the intake 22 which will draw ambient air through intake 44 at the grille area through the dirty air passage 40 and filter cartridge 56 and clean air from the filter cartridge 56 through clean air passage 62 and hose 66 into the turbocharger and thus into the engine 14.

A particular advantage of the invention lies in the location of the clean air passage outlet 66 and the provision of the flexible hose 68 which together permit the hood to be opened to the service position without disturbing the clean air passageway from the filter 56 to the turbocharger with the attendant risk of dirt entering the engine.

Thus there has been described, in accordance with the invention an engine air induction system with air cleaner in hood which fully meets the objects and advantages set forth above. It is recognized that those of ordinary skill in the art, upon reading the foregoing description and reviewing the drawings, will conceive of variations, alternatives and modifications which may be made. For example, the hood could be constructed with the dirty air passage 40 comprising an opening from the filter compartment 50 directly through the skin of the hood to a side thereof. Accordingly, it is desired to cover all such variations, alternatives, and modifications as fall within the spirit and scope of the appended claims.

What is claimed is:

1. In a truck of the type having a frame, a forwardly mounted engine compartment, an engine mounted on said frame and disposed in said engine compartment, said engine having an air intake opening, and a vehicle hood attached to said frame for pivotal movement about a transverse axis adjacent the forward end of said frame between a closed position enclosing said engine compartment and an open position forward of said engine compartment, the improvement comprising an engine air induction system disposed in said hood, said induction system including ambient air intake means, a filter housing in fluid communication with said ambient air intake, a filter means within said housing and having a filtered air outlet, and passage means in fluid communication with said filtered air outlet and extending to an outlet adjacent said transverse axis, and a flexible fluid communication means extending between said passage means outlet and said engine air intake opening, said flexible fluid communications means remaining connected between said passage means outlet and said engine air intake opening in both said open and said closed positions of said hood.

2. The invention in accordance with claim 1 and said flexible fluid communications means comprising a hose having a corrugated flexible wall.

3. The invention in accordance with claim 1 and said ambient air intake means comprising a fluid communication passage within said hood having an ambient air intake opening disposed adjacent a grille opening therein.

4. The invention in accordance with claim 1 and said filter housing having a selectively openable door therein, said door being of sufficient size to permit replacement of said filter means within said housing.

* * * * *